(12) United States Patent
Huber et al.

(10) Patent No.: US 12,491,986 B2
(45) Date of Patent: Dec. 9, 2025

(54) INERTIAL WEIGHT SYSTEM FOR MAIN ROTOR BLADES

(71) Applicant: Bell Textron Inc., Fort Worth, TX (US)

(72) Inventors: Bryan Huber, Keller, TX (US); Brian Erik Barnes, Bedford, TX (US); Gary Miller, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/545,704

(22) Filed: Dec. 19, 2023

(65) Prior Publication Data

US 2025/0196995 A1 Jun. 19, 2025

(51) Int. Cl.
*B64C 11/00* (2006.01)

(52) U.S. Cl.
CPC .................. *B64C 11/008* (2013.01)

(58) Field of Classification Search
CPC ....... F01D 5/027; B64C 11/008; B64C 11/16; B64C 11/20; B64C 27/008; B64C 27/46; B64C 27/473
See application file for complete search history.

(56) References Cited

U.S. PATENT DOCUMENTS

| | | | | |
|---|---|---|---|---|
| 2,754,917 A * | 7/1956 | Kee | ................. | B64C 27/008 416/144 |
| 3,103,977 A * | 9/1963 | Negroni | ................. | B64C 27/46 416/241 A |
| 3,999,888 A * | 12/1976 | Zincone | ................. | B64C 27/008 416/224 |
| 4,150,920 A * | 4/1979 | Belko | ................. | B64C 27/008 416/226 |
| 5,273,398 A * | 12/1993 | Reinfelder | ................. | B64C 27/008 416/500 |
| 5,346,367 A * | 9/1994 | Doolin | ................. | B64C 27/473 156/213 |
| 5,462,409 A * | 10/1995 | Frengley | ................. | B29C 70/302 416/144 |
| 6,139,271 A * | 10/2000 | Chadwick | ................. | B64C 27/46 416/139 |
| 6,196,066 B1 * | 3/2001 | Barbier | ................. | F16F 15/32 73/459 |
| 6,311,924 B1 * | 11/2001 | Ferrer | ................. | B64C 27/008 244/17.13 |
| 7,097,427 B2 | 8/2006 | Kuhns et al. | | |
| 8,029,240 B2 | 10/2011 | Cawthorne et al. | | |
| 9,216,821 B1 * | 12/2015 | Holemans | ................. | B64C 27/467 |
| 10,981,647 B2 * | 4/2021 | Self | ................. | B64C 27/008 |
| 2004/0222329 A1 * | 11/2004 | Kuhns | ................. | B64C 27/473 244/6 |

(Continued)

FOREIGN PATENT DOCUMENTS

| | | |
|---|---|---|
| EP | 2612812 A2 | 7/2013 |
| EP | 3321177 A1 | 5/2018 |
| EP | 3437992 A1 | 2/2019 |

*Primary Examiner* — Courtney D Heinle
*Assistant Examiner* — Cameron A Corday
(74) *Attorney, Agent, or Firm* — Bradley Arant Boult Cummings LLP

(57) ABSTRACT

A rotor-blade weight-carrier system includes a weight carrier positioned within a rotor blade and a plurality of weights positioned within the weight carrier.

20 Claims, 9 Drawing Sheets

(56) References Cited

U.S. PATENT DOCUMENTS

| | | | |
|---|---|---|---|
| 2005/0254947 A1* | 11/2005 | Loftus | B64C 27/473 416/144 |
| 2013/0173224 A1* | 7/2013 | Santerre | B64F 5/40 703/1 |
| 2014/0086750 A1* | 3/2014 | Cawthorne | B64D 9/00 29/889.71 |
| 2018/0072412 A1* | 3/2018 | Buesing | B64C 11/32 |
| 2019/0291861 A1* | 9/2019 | McIntyre | B64C 11/26 |
| 2021/0094567 A1* | 4/2021 | Imai | B60W 60/001 |

* cited by examiner

INERTIAL WEIGHT SYSTEM FOR MAIN ROTOR BLADES

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

TECHNICAL FIELD

This disclosure relates in general to the field of rotor-blade mass balance, and more particularly, but not by way of limitation, to a weight-carrier system for addition of inertia to rotor blades.

BACKGROUND

This section provides background information to facilitate a better understanding of the various aspects of the disclosure. It should be understood that the statements in this section of this document are to be read in this light, and not as admissions of prior art.

Rotor blades used in rotary aircraft often need heavy weights mid-span and/or adjacent to the tip of the rotor blades to perform efficiently. Lead is a common weight material, but it is considered to be toxic. Various environmental regulations restrict usage of toxic materials for future products.

SUMMARY

This summary is provided to introduce a selection of concepts that are further described below in the Detailed Description. This summary is not intended to identify key or essential features of the claimed subject matter, nor is it intended to be used as an aid in limiting the scope of claimed subject matter.

A rotor-blade weight-carrier system includes a weight carrier positioned within a rotor blade and a plurality of weights positioned within the weight carrier.

A rotor-blade weight-carrier system includes a composite weight carrier positioned within a rotor blade and a plurality of metal weights positioned within the composite weight carrier.

BRIEF DESCRIPTION OF THE DRAWINGS

The disclosure is best understood from the following Detailed Description when read with the accompanying Figures. It is emphasized that, in accordance with standard practice in the industry, various features are not necessarily drawn to scale. In fact, the dimensions of various features may be arbitrarily increased or reduced for clarity of discussion.

DETAILED DESCRIPTION

Figure 1A:
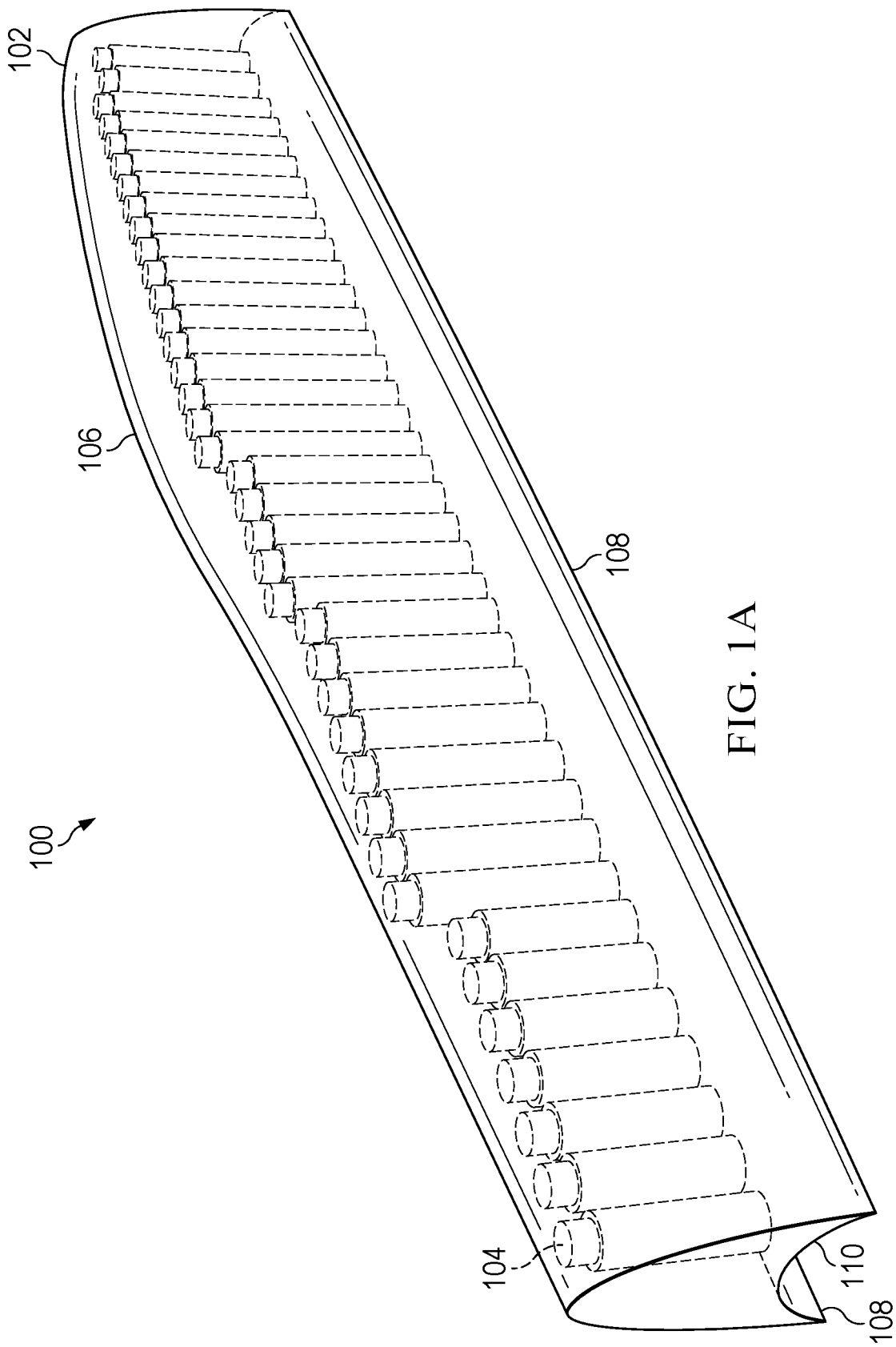
FIGS. 1A-C illustrate a weight-carrier system according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a Figure may illustrate an illustrative embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following Detailed Description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

A number of different non-toxic materials of varying density exist that may be viable weight materials. Some materials, like Tungsten, are denser than lead, but are also hard and brittle and therefore can be more difficult to machine than lead. Rotor-blade composite weight-carrier systems that use rods, bars, or slugs of varying materials, sizes, and densities can serve as a more cost-efficient and environmentally safe solution than those used in the past. Typical rotor-blade inertia weights include an engineered shape that is machined or cast from a heavy material for the purpose of rotor-blade inertial balance. Some rotor-blade weight-carrier systems use composite weight carriers that employ one or more of varied diameter rods, rod segments, or bars that are bonded into the rotor blade provide a heavy weight that is less rigid than Tungsten-based inertial weights. Various rotor-blade weight-carrier systems take advantage of internal volume in a leading edge of a rotor blade.

In accordance with principles disclosed herein, rotor-blade weight-carrier systems are engineered to ensure they can carry a desired load. Weights used in the rotor-blade weight-carrier systems are usually machined to exactly match a molded cavity of the rotor blade. The weight carrier may be formed via, for example, molding or machining. Composite materials are chosen for the weights that are less rigid than machined Tungsten. A typical design allows for the use of different-sized rods or rod segments in order to fine tune total mass and distribution thereof. A variety of weight-carrier and weight materials are available. Materials such as tungsten rods are readily available and are cheaper and easier to cut than custom-machined tungsten blocks used in prior systems. Materials can be varied within each bore to tailor the mass properties of the rotor blade. A rotor-blade weight-carrier system can be tailored to minimize rotor-blade balance pocket maximal capacity. Weight-carrier systems as disclosed herein can be utilized in conjunction with many different rotor-blade shapes including, but not limited to, blades having a large leading-edge cavity.

In some rotor-blade shapes, a denser weight-carrier material may be appropriate than a composite material in order to achieve a desired weight-carrier system mass within a given available volume within the rotor blade.

Figure 1B:
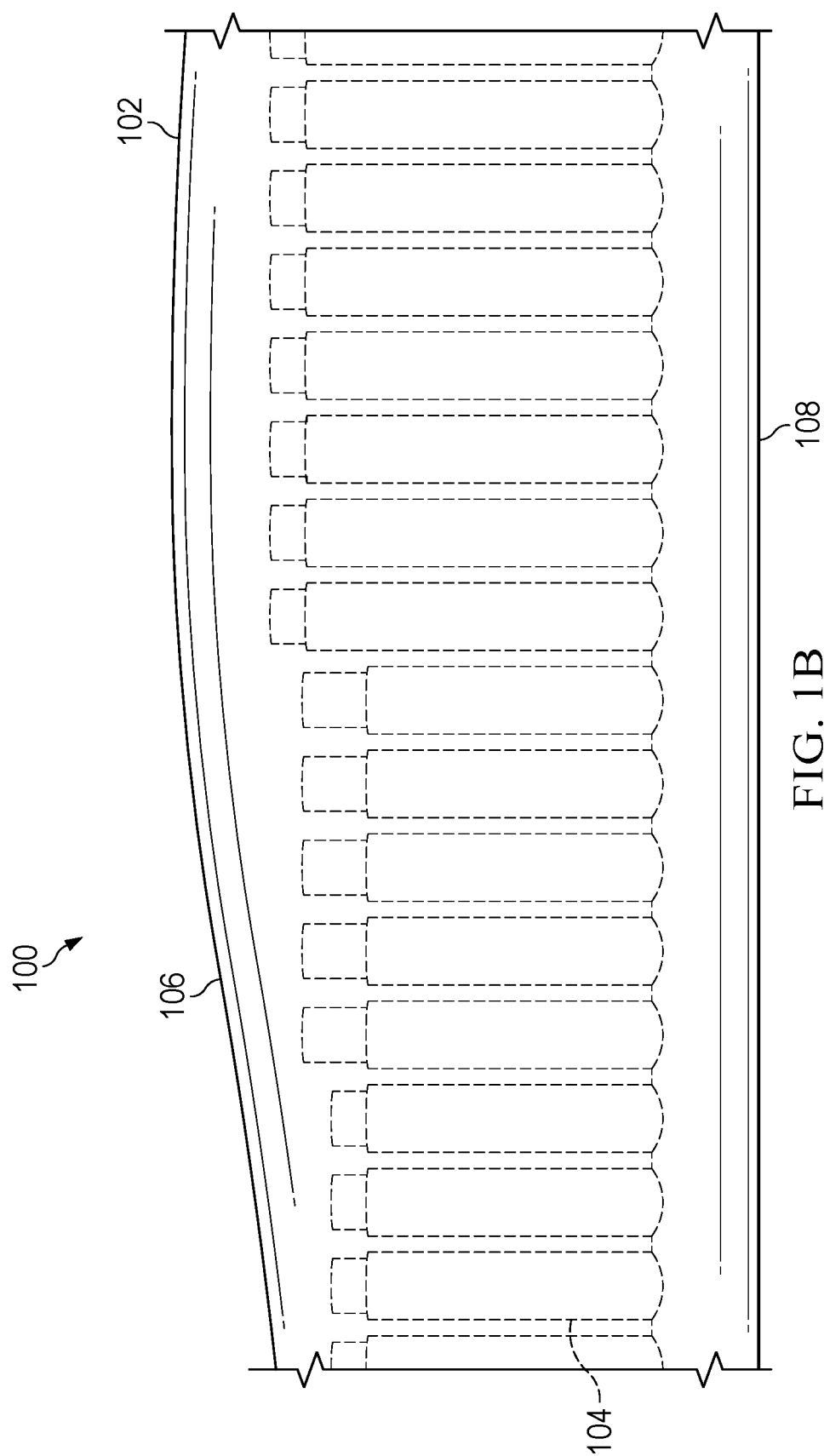
Figure 1C:
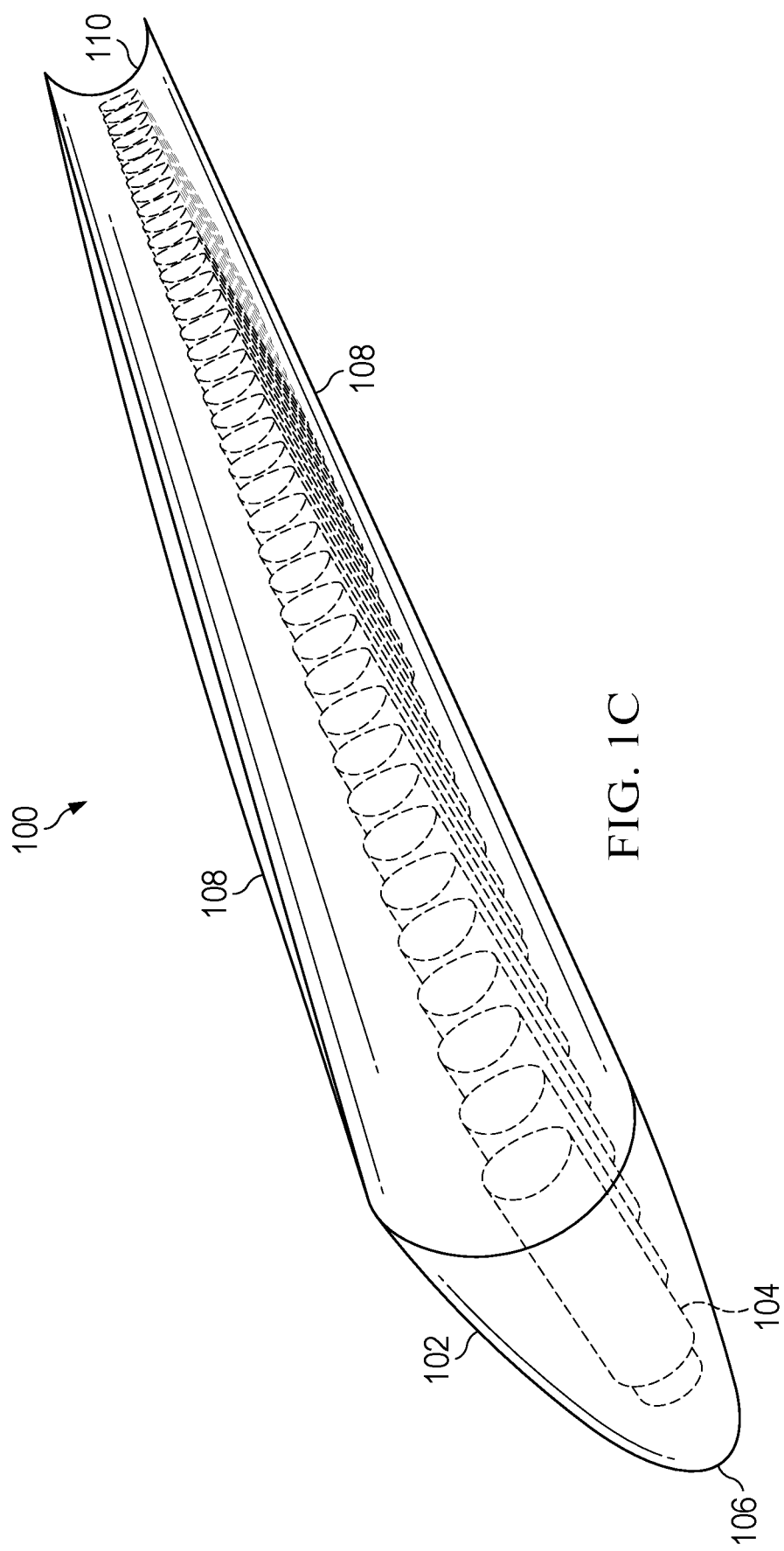

FIGS. 1A-C illustrate a weight-carrier system 100. FIG. 1A is a top perspective view of the weight-carrier system 100. The weight-carrier system 100 includes a weight carrier 102 and a plurality of weights 104 contained within the weight carrier 102. The weight-carrier system 100 is illustrated as transparent so that details of the plurality of weights 104 can be seen, although in a typical embodiment, the weight carrier 102 is not transparent.

Although a plurality of the weights 104 are illustrated in FIG. 1A, only one of the plurality of weights 104 is labeled with a reference numeral in order that details of the plurality of weights 104 are not unnecessarily obscured. Various of the plurality of weights 104 are illustrated as being of different dimensions in both length and diameter, the plurality of weights 104 shown in FIG. 1A being generally cylindrical in shape and having a smaller diameter portion and a greater diameter portion. It will be understood that weights employed in accordance with principles set forth herein need not necessarily be cylindrical in shape.

Also shown in FIG. 1A are a generally convex leading edge 106 of the weight carrier 102 and trailing edges 108 of the weight carrier 102, the trailing edges 108 being terminal ends of a trailing concave section 110 of the weight carrier 102. In the embodiment illustrated in FIG. 1A, the trailing concave section 110 is so shaped in order to maximize surface-area contact between the weight carrier 102 and a spar or other internal structural component of a rotor blade into which the weight-carrier system 100 is to be incorporated.

FIG. 1B is a partial top view of the weight-carrier system 100 that illustrates various of the plurality of weights 104 within the weight carrier 102 in more detail. As noted above, particular dimensions of various of the plurality of weights 104 can vary in accordance with design considerations.

FIG. 1C is a bottom perspective view of the weight-carrier system 100. In FIG. 1C, the trailing edges 108 and the trailing concave section 110 are shown more clearly. It will be apparent that the weight carrier 102 need not necessarily have a trailing concave section as illustrated; rather, a differently shaped section adjacent the trailing edges 108 can be employed in accordance with design considerations such as a shape of a spar or other structural component of a rotor blade into which the weight-carrier system is to be incorporated.

Figure 2A:
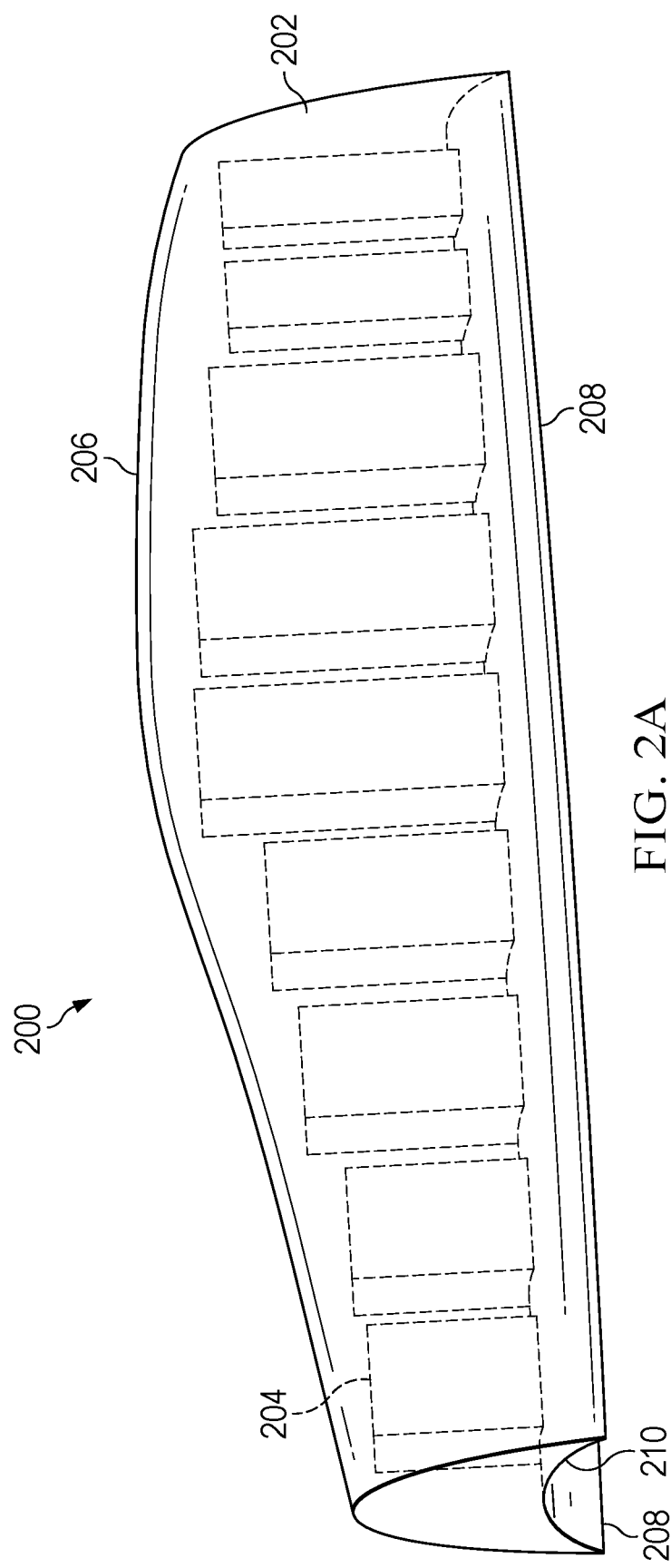
FIGS. 2A-C illustrate a weight-carrier system according to one or more aspects of the disclosure.
Figure 2B:
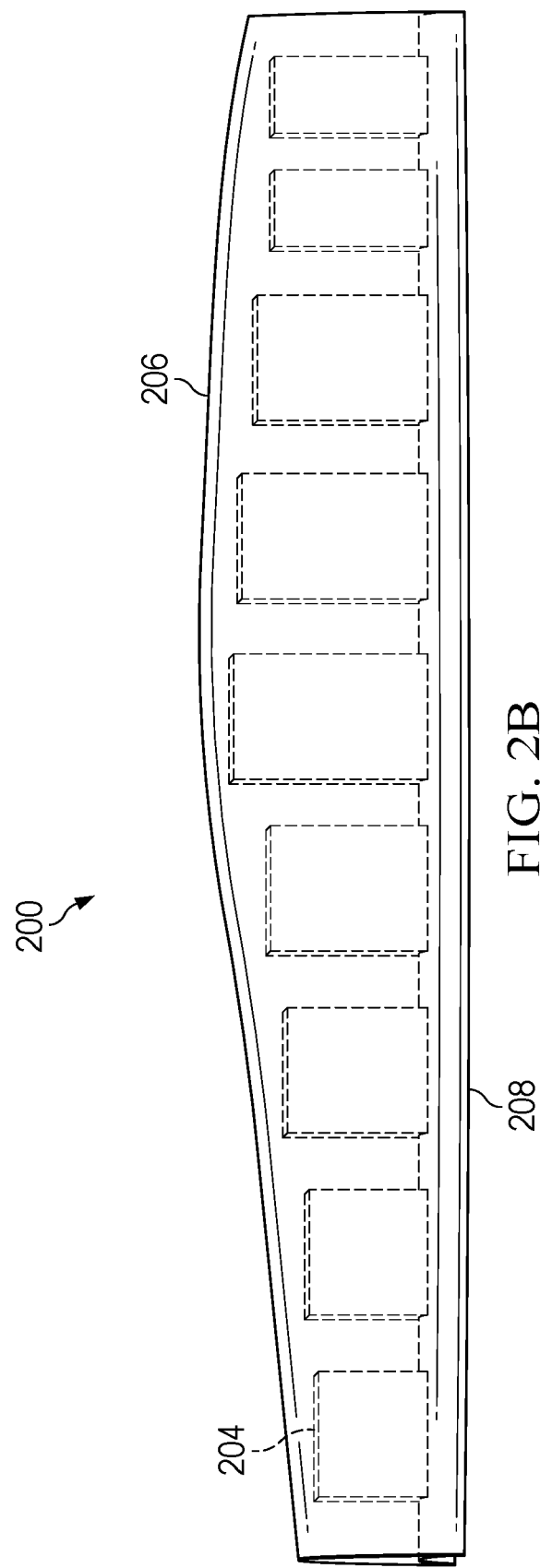
Figure 2C:
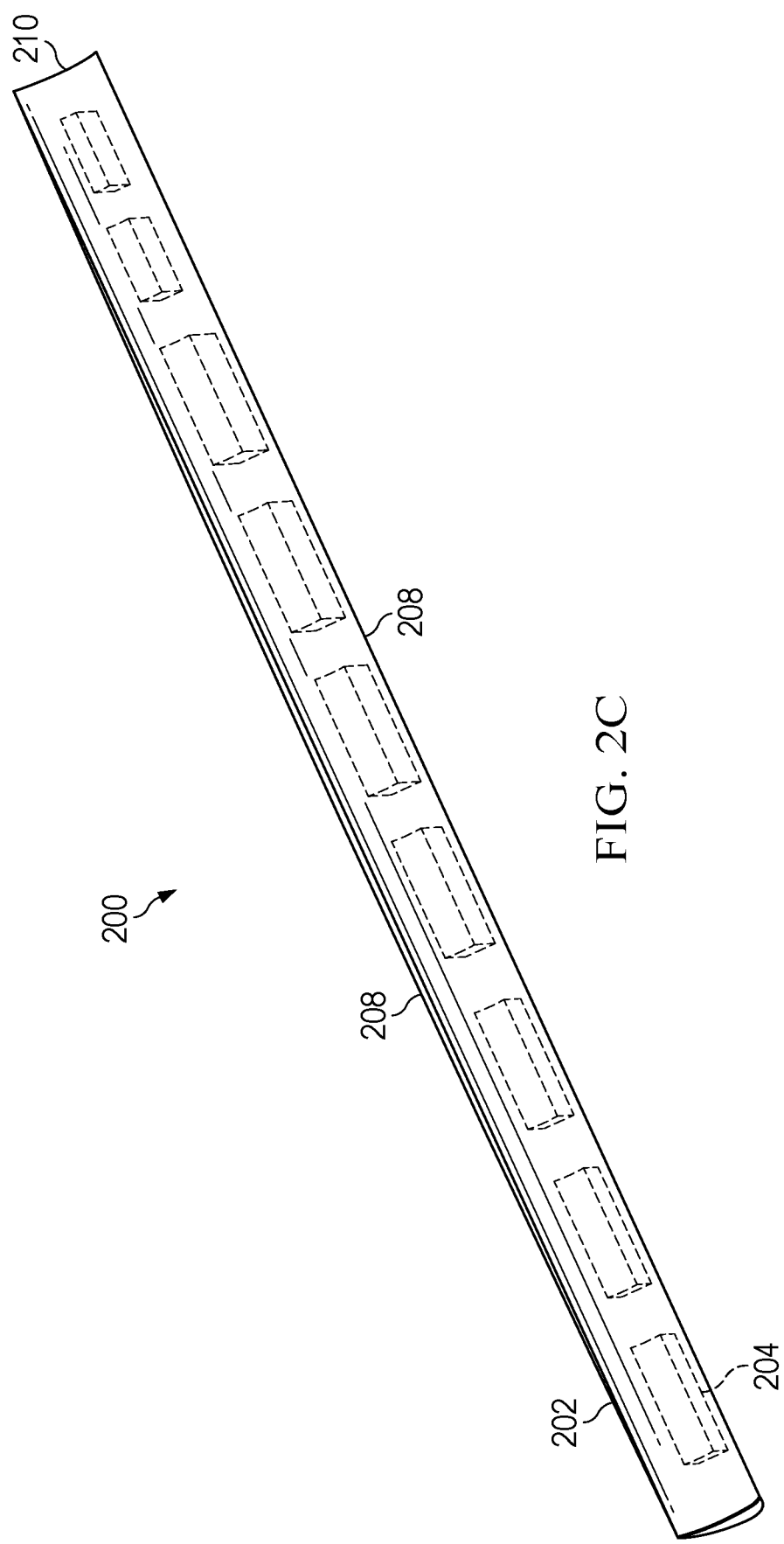

FIGS. 2A-C illustrate a weight-carrier system 200. FIG. 2A is a top perspective view of the weight-carrier system 200. The weight-carrier system 200 includes a weight carrier 202 and a plurality of weights 204 contained within the weight carrier 202. The weight-carrier system 200 is illustrated as transparent so that details of the plurality of weights 204 can be seen, although in a typical embodiment, the weight carrier 202 is not transparent.

Although a plurality of the weights 204 are illustrated in FIG. 2A, only one of the plurality of weights 204 is labeled with a reference numeral in order that details of the plurality of weights 204 are not unnecessarily obscured. Various of the plurality of weights 204 are illustrated as being of different dimensions in length, width, and height, the plurality of weights 204 shown in FIG. 2A being generally rectangular in shape. It will be understood that weights employed in accordance with principles set forth herein need not necessarily be rectangular in shape.

Also shown in FIG. 2A are a generally convex leading edge 206 of the weight carrier 202 and trailing edges 208 of the weight carrier 202, the trailing edges 208 being terminal ends of a trailing concave section 210 of the weight carrier 202. In the embodiment illustrated in FIG. 2A, the trailing concave section 210 is so shaped in order to maximize surface-area contact between the weight carrier 202 and a spar or other internal structural component of a rotor blade into which the weight-carrier system 200 is to be incorporated.

FIG. 2B is a partial top view of the weight-carrier system 200 that illustrates various of the plurality of weights 204 within the weight carrier 202 in more detail. As noted above, particular dimensions of various of the plurality of weights 204 can vary in accordance with design considerations.

FIG. 2C is a bottom perspective view of the weight-carrier system 200. In FIG. 2C, the trailing edges 208 and the trailing concave section 210 are shown more clearly. It will be apparent that the weight carrier 202 need not necessarily have a trailing concave section as illustrated; rather, a differently shaped section adjacent the trailing edges 208 can be employed in accordance with design considerations such as a shape of a spar or other structural component of a rotor blade into which the weight-carrier system is to be incorporated.

Figure 3:
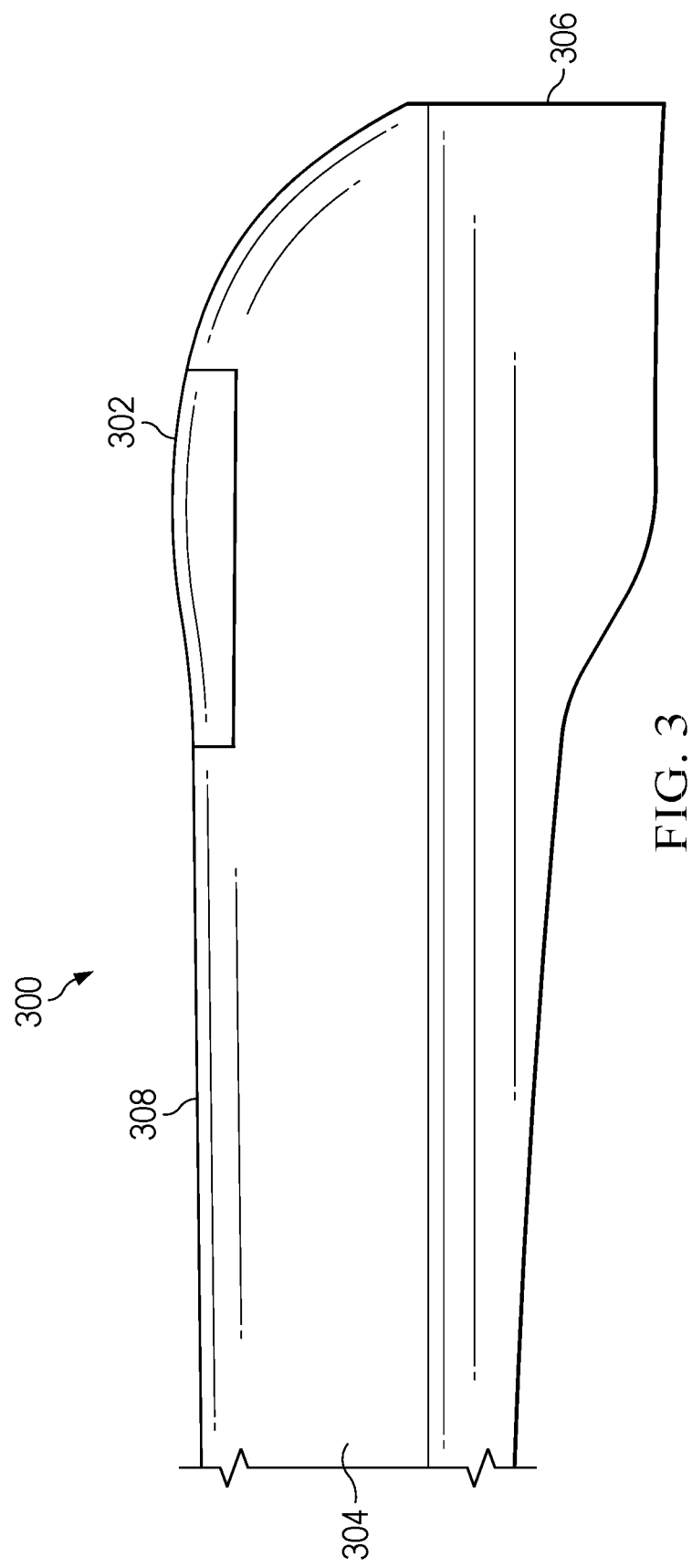
FIG. 3 is a partial top view of an outboard tip portion of a rotor-blade system.

FIG. 3 is a top partial view of an outboard tip portion of a rotor-blade system 300. The rotor-blade system 300 includes a weight-carrier system 302 mounted to a rotor-blade spar of a rotor blade 304. The weight-carrier system 302 includes a plurality of weights, the plurality of weights not being explicitly shown. The weight-carrier system 302 is shown positioned adjacent to a leading edge 308 of the rotor blade 304 and nearer to an outboard tip end 306 of the rotor blade 304 than to a root end (not shown) of the rotor blade 304. It will be understood that positioning of the weight-carrier system 302, the number of weights and dimensions thereof, as well as materials selected for various components of the weight-carrier system 302 can be chosen in accordance with design considerations.

Figure 4:
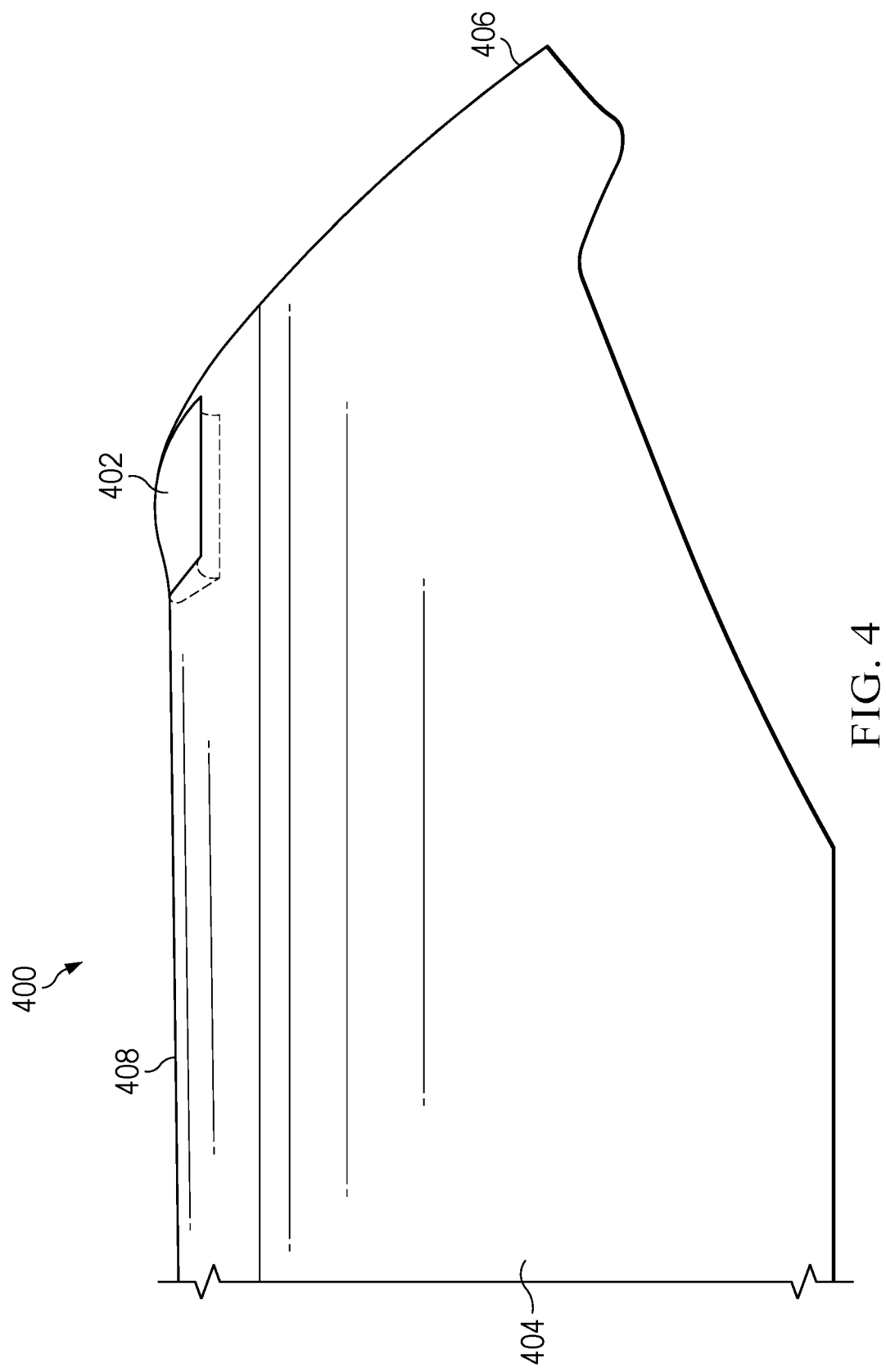
FIG. 4 is a top perspective view of an outboard tip portion of a rotor-blade system.

FIG. 4 is a top perspective view of an outboard tip portion of a rotor-blade system 400. The rotor-blade system 400 includes a weight-carrier system 402 mounted to a rotor-blade spar of a rotor blade 404. The weight-carrier system 402 includes a plurality of weights, the plurality of weights not being explicitly shown. The weight-carrier system 402 is shown positioned adjacent to a leading edge 408 of the rotor blade 404 and nearer to an outboard tip end 406 of the rotor blade 404 than to a root end (not shown) of the rotor blade 404. It will be understood that positioning of the weight-carrier system 402, the number of weights and dimensions thereof, as well as materials selected for various components of the weight-carrier system 402 can be chosen in accordance with design considerations.

Figure 5:
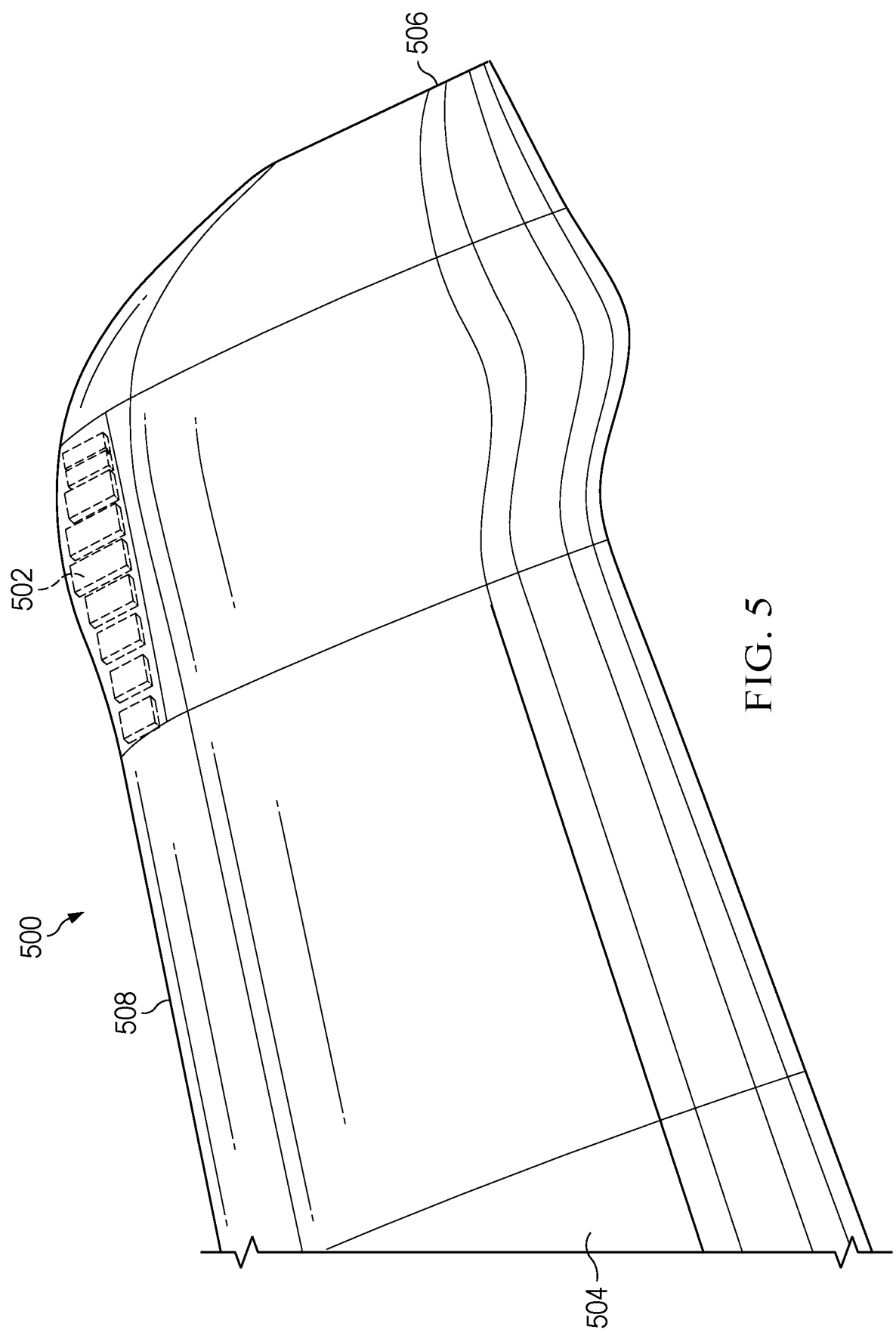
FIG. 5 is a top perspective view of an outboard tip portion of a rotor-blade system.

FIG. 5 is a top perspective view of an outboard tip portion of a rotor-blade system 500. The rotor-blade system 500 includes a weight-carrier system 502 mounted to a rotor-blade spar of a rotor blade 504. The weight-carrier system 502 includes a plurality of rectangular-shaped weights. The weight-carrier system 502 is shown positioned adjacent to a leading edge 508 of the rotor blade 504 and nearer to an outboard tip end 506 of the rotor blade 504 than to a root end (not shown) of the rotor blade 504. It will be understood that positioning of the weight-carrier system 502, the number of weights and dimensions thereof, as well as materials selected for various components of the weight-carrier system 502 can be chosen in accordance with design considerations.

In typical embodiments, a weight-carrier system can be formed of composite or other materials that can be bonded adjacent to a rotor-blade leading edge and cavities drilled or otherwise formed therein and weights inserted into a weight carrier of the weight-carrier system to tune a rotor blade for inertial requirements. The cavities can be cylindrical, rectangular, or another cross-sectional shape in order to accommodate weights to be contained therein. Tungsten or other materials that possess greater density than that of the weight carrier are often employed. Steel, brass, aluminum, and lead, as well as various metal alloys, are all examples of weight materials that may be employed in various embodiments. Table 1 below lists examples of materials that may be used for the weights.

TABLE 1

| Material | Density (lb/in3) |
| --- | --- |
| 7075-T6 sheet | 0.101 |
| C63000 Nickel Aluminum Bronze | 0.274 |
| 301 annealed | 0.286 |
| Lead Antimony | 0.394 |
| 80/20 Tungsten Copper | 0.564 |
| ASTM B 777 Class 1 | 0.614 |
| 90/10 Tungsten Copper | 0.625 |
| 92.5/5.25/2.25 WNiFe (Class 2) | 0.632 |
| Tungsten | 0.695 |
| Gold | 0.697 |
| Osmium | 0.816 |

If the weight carrier is to be drilled in order to insert weights in cavities thereby formed in the weight carrier, it is often preferable to drill from either a leading or a trailing edge, root end side, or top of the rotor blade such that an orientation of the weights is parallel to a chordwise direction of the rotor blade; in this way, centrifugal force due to rotation of the rotor blade is less likely to result in the weights being dislodged from the weight carrier. In a typical embodiment, the weight carrier is bonded into the structure of the rotor blade with weights already bonded into the weight carrier. The weight-carrier system is usually configured specifically to the shape of the rotor blade into which the weight-carrier system is to be incorporated.

In contrast to prior systems that utilized, for example, machined Tungsten or cast lead, various embodiments utilize materials that are easier to bond into a rotor blade with adhesives. Typical weight-carrier systems possess advantages over such prior approaches in that composites or other suitable materials are less dense and stirr than Tungsten are similar to parent blade materials, and use of a plurality of weights to avoid abrupt stiffness changes that could lead to premature component failure.

Typical weight-carrier systems include, but are not limited to, fiberglass, dense polyurethane, epoxy, compression-molded composite materials, aluminum, 3D-printed materials, and brass. It is preferable in most embodiments that the weight-carrier material be compliant in similar fashion to parent blade materials, are easily bondable with adhesives, and less dense than materials used for the weights. Because the weight carrier itself contributes to overall material mass of the weight-carrier system, an alloy or blend of metals could be desirable for use to fill part of the volume of the rotor blade as desired. The weights can be formed of different materials within a given weight carrier.

In many applications, a mass balance is desired in which a center of gravity of the rotor blade is closer to the leading edge of the rotor blade; as such, a denser weight material may be positioned closer to a rotor-blade leading edge and a filler plug utilized behind the denser weight material and close to a rotor-blade trailing edge. In some embodiments, multiple weights as shown herein are joined together in order to tune bending moments induced by the weights within the weight-carrier system.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term comprising within the claims is intended to mean including at least such that the recited listing of elements in a claim are an open group. The terms a, an, and other singular terms are intended to include the plural forms thereof unless specifically excluded.

What is claimed is:

1. A rotor-blade weight-carrier system comprising:
   a weight carrier positioned within a rotor blade, wherein a shape of the weight carrier comprises a convex leading edge and a trailing concave section; and
   a plurality of unitary weights positioned within the weight carrier;
   wherein at least one of the plurality of unitary weights varies in width relative to another of the plurality of unitary weights;
   wherein a perpendicular distance between a point on a leading edge to a same point directly below on a trailing edge of at least one of the plurality of unitary weights varies relative a perpendicular distance between a point on a leading edge to a same point directly below on a trailing edge of another of the plurality of unitary weights.

2. The rotor-blade weight-carrier system of claim 1, wherein the weight carrier comprises a material selected from fiberglass and a composite material.

3. The rotor-blade weight-carrier system of claim 1, wherein: the plurality of unitary weights comprise at least one of Tungsten and a Tungsten alloy; and
   a density of the plurality of unitary weights is greater than a density of the weight carrier.

4. The rotor-blade weight-carrier system of claim 1, wherein the weight carrier comprises a shape that conforms to an available volume at a portion of the rotor blade where the weight carrier is to be installed.

5. The rotor-blade weight-carrier system of claim 4, wherein:
   the weight carrier is positioned adjacent a leading edge of the rotor blade; and
   the shape comprises:
   two trailing edges at terminal ends of the trailing concave section.

6. The rotor-blade weight-carrier system of claim 5, wherein the trailing concave section is shaped so as to maximize surface-area contact between the weight carrier and an internal structural component of the rotor blade.

7. The rotor-blade weight-carrier system of claim 1, wherein: the plurality of unitary weights are positioned within cavities formed in the weight carrier;

at least one of the plurality of unitary weights varies in at least one of density and diameter relative to another of the plurality of unitary weights; and wherein at least one of the cavities is adapted to receive weights having variable density or diameter.

8. The rotor-blade weight-carrier system of claim 1, wherein the rotor-blade weight-carrier system is positioned adjacent a leading edge of the rotor blade.

9. The rotor-blade weight-carrier system of claim 1, wherein the rotor-blade weight-carrier system is positioned closer to an outboard tip end of the rotor blade than a root end of the rotor blade.

10. The rotor-blade weight-carrier system of claim 1, wherein the plurality of unitary weights are identical in material.

11. The rotor-blade weight-carrier system of claim 1, wherein the plurality of unitary weights are positioned in cavities within the weight carrier.

12. The rotor-blade weight-carrier system of claim 11, wherein the cavities are drilled parallel to a chordwise direction of the rotor blade.

13. A rotor-blade weight-carrier system comprising:
a composite weight carrier positioned within a rotor blade, wherein the composite weight carrier comprises a leading edge and a trailing concave section; and
a plurality of unitary metal weights positioned within the composite weight carrier;
wherein at least one of the plurality of unitary metal weights varies width relative to another of the plurality of unitary metal weights; and
wherein a perpendicular distance between a point on a leading edge to a same point directly below on a trailing edge of at least one of the plurality of unitary metal weights varies relative a perpendicular distance between a point on a leading edge to a same point directly below on a trailing edge of another of the plurality of unitary metal weights.

14. The rotor-blade weight-carrier system of claim 13, wherein the plurality of unitary metal weights comprise Tungsten.

15. The rotor-blade weight-carrier system of claim 13, wherein the composite weight carrier comprises two trailing edges at terminal ends of the trailing concave section.

16. The rotor-blade weight-carrier system of claim 15, wherein the leading edge is positioned adjacent a leading edge of the rotor blade.

17. The rotor-blade weight-carrier system of claim 15, wherein the trailing concave section is shaped so as to maximize surface-area contact between the composite weight carrier and an internal structural component of the rotor blade.

18. The rotor-blade weight-carrier system of claim 13, wherein the plurality of unitary metal weights are positioned within cavities drilled in the composite weight carrier.

19. The rotor-blade weight-carrier system of claim 13, wherein the plurality of unitary metal weights are identical in material.

20. The rotor-blade weight-carrier system of claim 13, wherein the plurality of metal unitary weights are oriented in cavities drilled parallel to a chordwise direction of the rotor blade.

\* \* \* \* \*